United States Patent [19]

Mack et al.

[11] 4,170,762
[45] Oct. 9, 1979

[54] FLOW CHANNEL FOR FLUID MEDIUM LASER

[75] Inventors: Michael E. Mack, Manchester; Jaime A. Woodroffe, Andover, both of Mass.

[73] Assignee: Jersey Nuclear-Avco Isotopes, Inc., Bellevue, Wash.

[21] Appl. No.: 724,721

[22] Filed: Sep. 20, 1976

[51] Int. Cl.² .............................................. H01S 3/02
[52] U.S. Cl. .......................... 331/94.5 D; 331/94.5 L
[58] Field of Search ..................... 331/94.5 L, 94.5 D; 356/181, 246

[56] References Cited

U.S. PATENT DOCUMENTS

| | | | |
|---|---|---|---|
| 3,725,810 | 4/1973 | Ashkin et al. | 331/94.5 L |
| 3,740,665 | 6/1973 | Itzkan | 331/94.5 L |
| 3,805,187 | 4/1974 | Lempicki et al. | 331/94.5 L |
| 3,992,684 | 11/1976 | Patrick et al. | 331/94.5 L |

OTHER PUBLICATIONS

Boiteux et al., *Applied Optics*, vol. 9, No. 2, Feb. 1970, pp. 514, 515.
Varnado, S. G., *J. Applied Physics*, vol. 44, No. 11, Nov. 1973, pp. 5067, 5068.

*Primary Examiner*—William L. Sikes
*Attorney, Agent, or Firm*—Weingarten, Maxham & Schurgin

[57] ABSTRACT

A flow channel for a fluid laser medium which promotes high pulse rate high power lasing of the medium. The flow channel operates to permit this high efficiency operation by preparing the flowing laser material to stream past a set of windows for the application of transverse pumping radiation with a very smooth laminar flow having thin laminar boundary layers. This flow characteristic is provided by a carefully configured input channel. In addition, high quality flow characteristics are further insured by an exhaust channel which triggers a turbulent flow directly downstream of the windows and provides a controlled expansion without separation of the flowing laser material into an outlet conduit.

12 Claims, 8 Drawing Figures

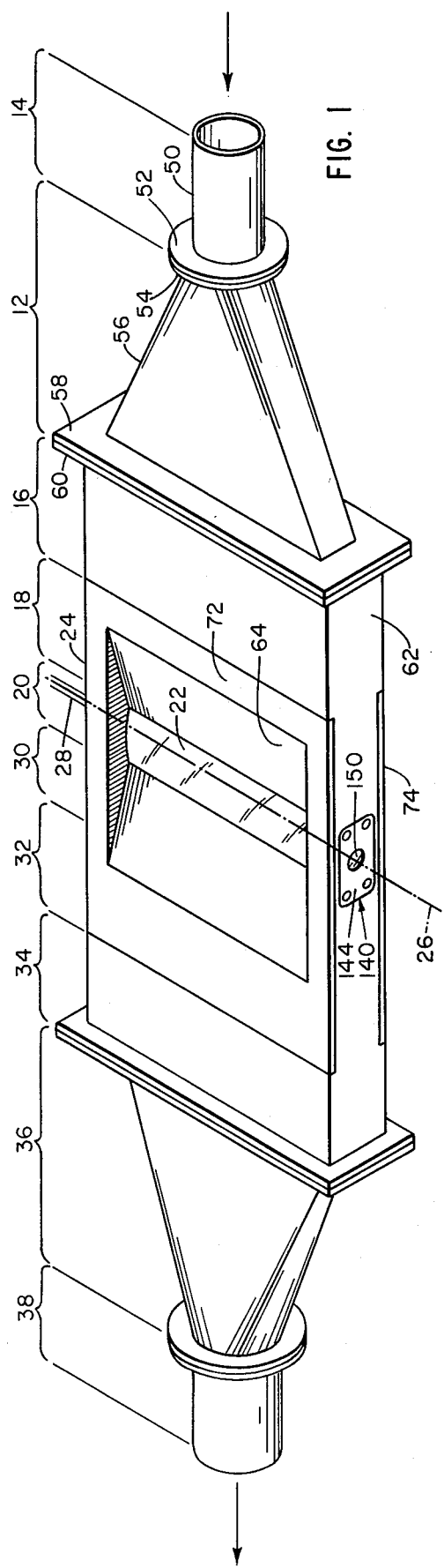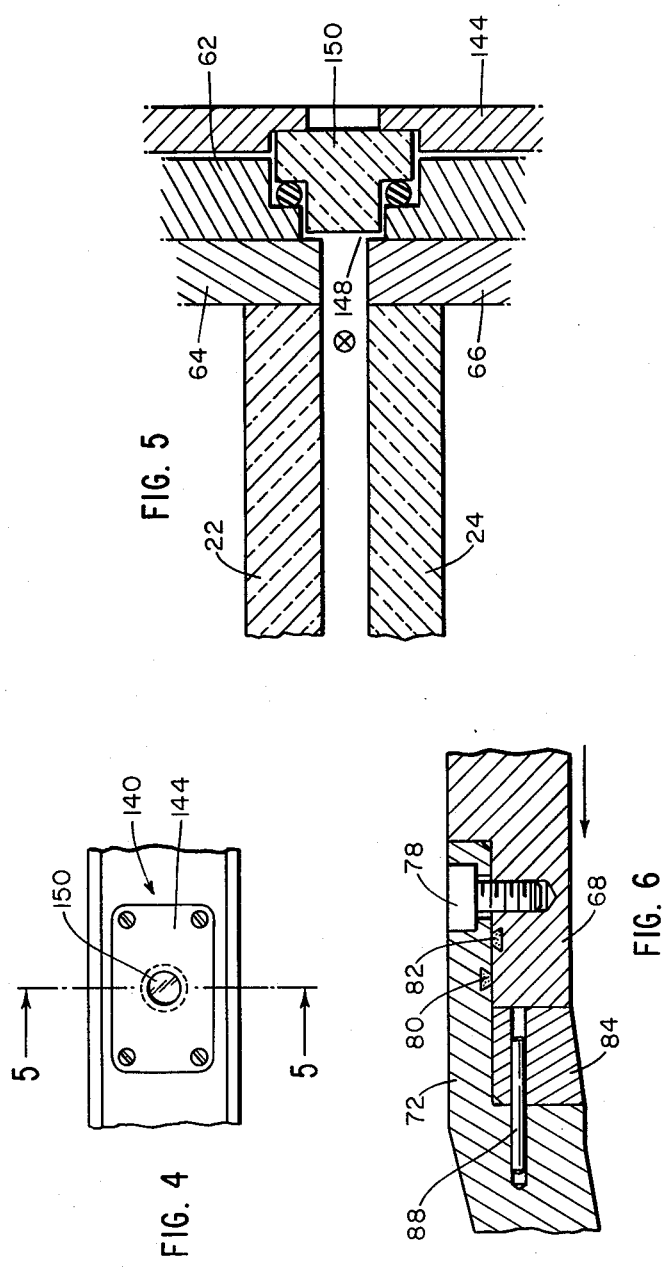

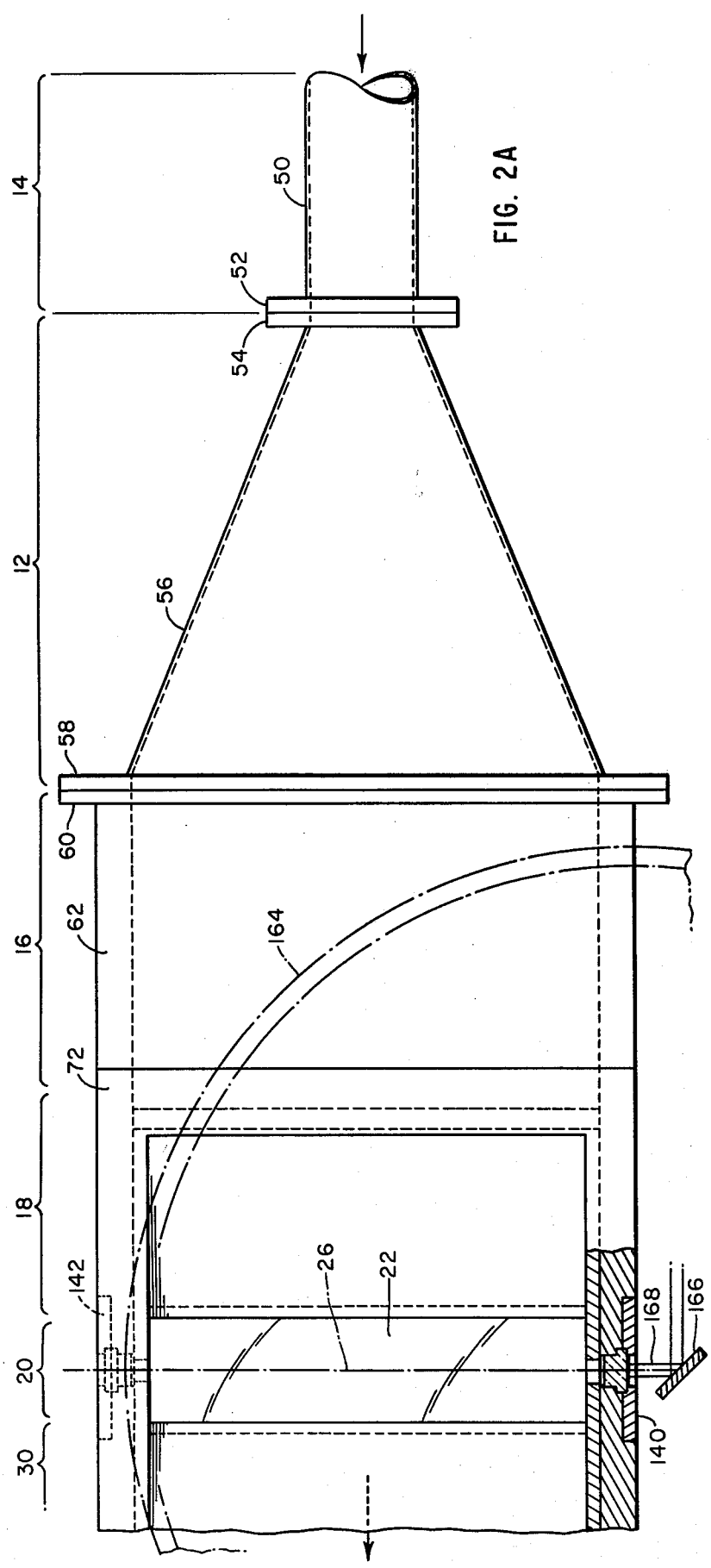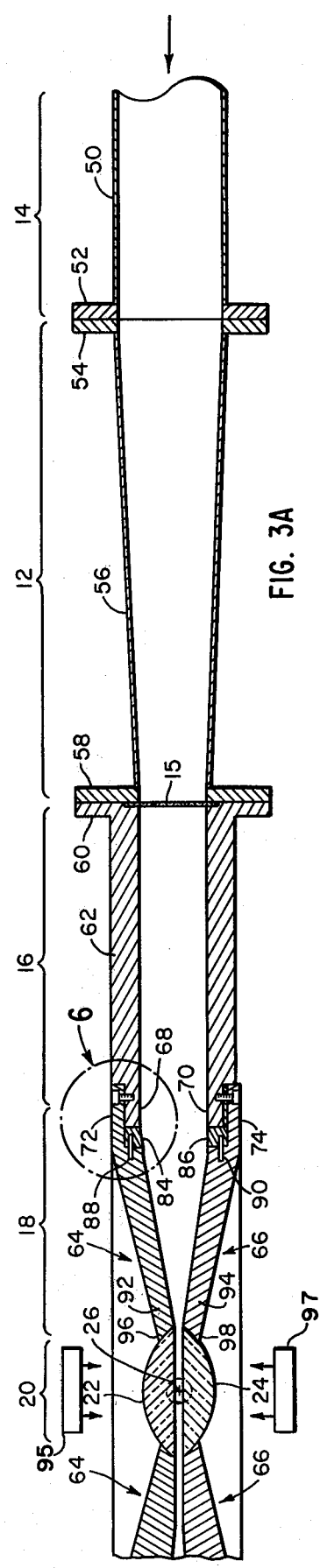

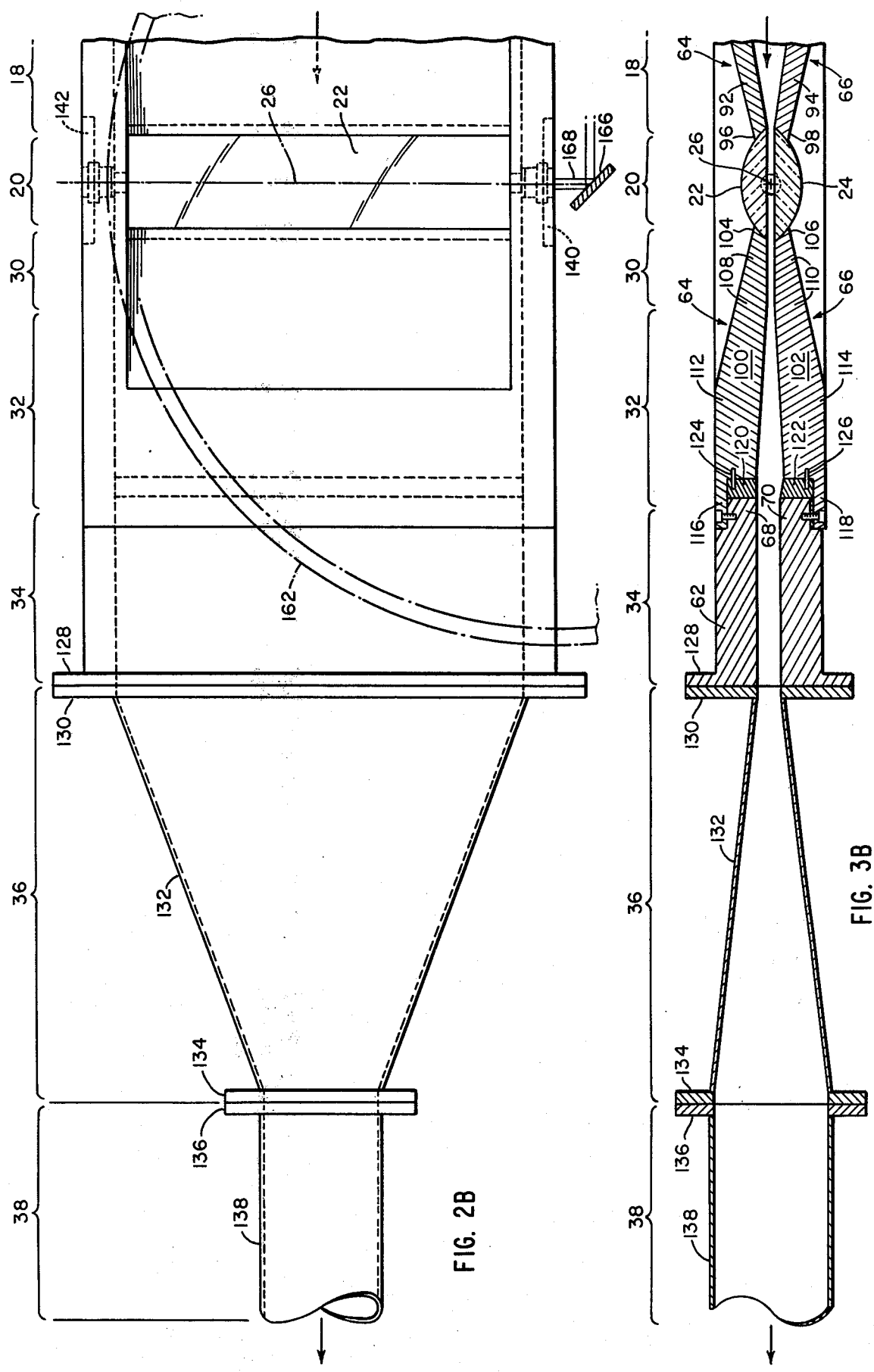

FLOW CHANNEL FOR FLUID MEDIUM LASER

FIELD OF THE INVENTION

The present invention relates to flow channels for fluid laser materials and in particular to a flow channel providing a high quality flow characteristic.

BACKGROUND OF THE INVENTION

In laser amplifiers or oscillators, typically employed in a system for isotopically selective photoexcitation, and more particularly as may be shown in U.S. Pat. No. 3,944,947, it is desired to be able to provide pulsed lasing of a flowing dye solution with high pulse rate and high power operation. The transverse pumped dye laser has been recognized as providing a channel configuration conducive to high pulse rate and high energy lasing. This is particularly so because the transverse flow of laser material passing on axis of optical excitation insures that the excited and heated particles will be swept beyond the active lasing region in the most rapid manner thereby providing a fresh supply of laser material at high rate. Additionally, with transverse pumping, heat generated in the lasing process within the lasing medium is rapidly carried from the active lasing area so as to minimize heat induced refraction variations that degrade laser beam quality.

While providing the conditions for high pulse rate and high energy lasing, it is also essential for applications of laser enrichment that the beam of laser radiation generated or amplified by the dye laser be of very high quality, that is exhibit very low divergence. This is particularly true where the produced laser beam is to traverse long distances, comprising many meters, of path length through regions which produce isotopically selective photoexcitation in the enrichment process.

While the basic configuration of a transverse pumped dye laser is known, as for example shown in U.S. Pat. No. 3,740,665, the means for creating conditions in the flow of laser material which permit high pulse rate and high energy lasing with very high laser beam quality have been less clearly understood.

BRIEF SUMMARY OF THE INVENTION

In accordance with the teaching of the present invention a flow channel for the transvere pumping of a flowing laser material is disclosed in which the flow of laser material is particularly controlled to permit high pulse rate, high energy lasing with a high quality, low divergence laser beam.

To provide these features, the flow channel of the present invention is configured to receive a flow of laser medium, typically a dye solution, from an inlet chamber into a region of expanding cross-section which converts the flow cross-section to a rectangular shape for application through the generally rectangular cross-section of the active region in the flow channel. The expanded flow is passed through a screen of fine mesh to reduce turbulences and then into a plenum of constant cross-sectional shape and area where screen induced disturbances are allowed to subside. Subsequently, a smoothly converging region of the flow channel compresses and accelerates the flowing laser material to a narrow region of rectangular cross-section defined by two optically transparent windows through which excitation radiation is applied in a center portion thereof to an active lasing region or optical axis of the flowing dye material. The walls of the converging region are carefully maintained free of steps or discontinuities which would disturb the laminar flow properties of the laser material as it enters the region defined by and passes between the transparent windows. A slightly converging aspect to the windows is employed to further assist in maintaining the smooth laminar flow properties of the laser material. In particular, the configuration provides not only a high quality laminar flow but a very thin laminar boundary layer thereby increasing the size of the region within the laser material which may be caused to lase without a reduction in beam quality.

The windows extend a long distance either side of the active lasing region to minimize heat absorption in neighboring, channel portions. In addition, the portion of the channel directly downstream of the windows is purposely made with a rough channel wall surface which causes tripping of the laser medium flow to a turbulent condition which prevents flow separation during expansion. The turbulent flow is then expanded without separation to a cross-sectional area matching the area of the ultimately reached output conduit. After a region of constant cross-sectional area and shape, a further portion of the flow channel provides a transformation in cross-sectional shape to the boundaries of the flow channel from the narrow rectangular shape of the channel directly downstream of the lasing region to the, typically circular, cross-sectional shape of the outlet conduit, while maintaining a constant cross-sectional area.

The configuration thus provided insures a thin laminar boundary layer for the fluent laser material which, in turn, permits high efficiency lasing operation in combination with a high quality output beam.

DESCRIPTION OF THE DRAWING

These and other features of the present invention are more fully set forth below in the solely exemplary and not limiting detailed description and accompanying drawing of which:

FIG. 1 is a pictorial plan view of the flow channel according to the present invention;

FIGS. 2A and 2B are segregated elevational views of the flow channel illustrated pictorially in FIG. 1;

FIGS. 3A and 3B are segregated interior sectional views of the flow channel illustrated in FIGS. 1, 2A and 2B;

FIG. 4 is an end view of a portion of the flow channel illustrated in FIG. 2;

FIG. 5 is a sectional view of a portion of the flow channel illustrated in FIGS. 2A, 2B and 4;

FIG. 6 is an expanded view of a portion of the sectional illustration of FIG. 3A.

DETAILED DESCRIPTION OF THE INVENTION

The present invention contemplates a flow channel for a laser which prepares a flow of lasing material to pass through a region in which lasing is induced with a flow characteristic which promotes high beam power and repetition rate with an output beam having relatively low divergence.

Such a flow channel is illustrated pictorially in FIG. 1 in which an expansion chamber 12 having a generally rectangular cross-section is positioned to receive the flow of fluid laser material, such as a dye solution, for example Rhodamine 6G in a water or alcohol solvent, from an input conduit 14. The expansion chamber 12 not only converts the conduit cross-sectional dimensions from circular to rectangular in order to prepare the flow of passage through the region of active lasing but expands the flow in the direction of the optical axis typically to its dimension in passing through the active lasing region.

Subsequent to the expansion chamber 12 a chamber 16 of unchanging cross-sectional shape and area is placed to permit eddy currents and other perturbations in the flow to settle subsequent to its passage through a fine mesh screen, shown below, separating the chamber 16 from the chamber 12. Subsequent to the chamber 16, a compression region 18 provides continuously reducing thickness in the flow channel while maintaining the dimension parallel to the optical axis. The chamber 18 provides a smooth acceleration of the flow toward a region 20 in which the flow is bounded by first and second optical windows 22 and 24 through which optical excitation radiation is focused to a region surrounding the optical axis 26 to produce active lasing resulting in the generation of an output beam 28 of laser radiation.

The transitions between the regions 16 and 18, and 18 and 20 along the walls of the channel facing the flow are made as smooth and free of step discontinuities as possible in order to create a thin, laminar flow boundary layer on each edge of the flow channel, and in particular bordering the windows 22 and 24 so as to confine regions of inhomogeneous flow to as small as possible a percentage of the flow channel width in the region of active lasing. In addition, the windows 22 and 24 are structured to be oversized in the dimension of fluent laser material flow in order to minimize the absorption of excitation radiation within the channel walls that might induce uneven heating and disturb the flow characteristics.

Downstream of the region 20 defined by the windows 22 and 24 is a chamber 30 in which the walls facing the flow are purposely structured rough as by sandblasting in order to trip the flow into a turbulent mode that allows subsequent expansion without flow separation. The turbulent flow enters a chamber 32 of expanding flow cross-sectional area brought on by a continuous increase in channel width up to a chamber 34 which provides a length of flow channel typically of constant cross-sectional area, which, in turn, is followed by a chamber 36 in which the cross-sectional shape of the flow is converted from that of the chamber 34 of basic rectangular form to a circular form for application to an exit conduit 38. The cross-sectional shape conversion in the chamber 36 is accomplished with a constant cross-sectional area which requires that the increase in cross-sectional area in the expansion region 32 be such as to achieve an ultimate cross-sectional area equivalent to that in the output conduit 38.

Again, the transitions, particularly between the chambers 32 and 34 and chambers 30 and 32 are kept free of step discontinuities that might disturb the flow and be reflected back upstream to impair the qualities, power or repetition rate of the output beam.

The specific dimensions of the various chamber components of the flow channel, reflected in chambers 12, 16, 18, 20, 30, 32, 34 and 36 are not critical but are governed by the following considerations. A convergence angle for the chamber 18 is preferably selected to have a typical half angle of 10°. This convergence angle produces an approximately 10-to-1 contraction ratio or 100-to-1 pressure ratio between the outlet of the channel 18 and its input. In addition, the windows 22 and 24 are also angled slightly inward with a half angle of approximately one-half degree in order to assure maintenance of laminar boundary layers in the lasing region. The divergence angle of the chamber 32 has a half angle of approximately 3.5°, thus allowing expansion of the flow without flow separation.

Having described thus above, in general, the characteristics of the flow channel according to the present invention with respect to FIG. 1, it will now serve to describe in detail the flow channel by reference to all the figures.

Typically, the material other than the optically transmissive windows, of which the flow channel is fabricated is stainless steel. The interior portions of the flow channel may be typically made smooth to a 30$\mu$ finished by mechanical polishing. Referring to FIGS. 1, 2A and 3A, the input conduit 14, which may typically be approximately 2 inches in diameter, terminates in a flange portion 50 which meets with a flange 52 on the receiving end of the dovetail-shaped expansion chamber 12. The flanges 50 and 52, as well as the end portions of the conduit 14 in expansion chamber 12 are made to form a continuous wall with a minimum of discontinuities to disturb the flow.

Similarly, the expansion chamber 12 terminates in a flange 54 which is mated and secured as by bolting with a flange 56 on the receiving end of the straight chamber 16. A screen 15 of 40 to 160 mesh approximately may typically be installed within a recess in the flange 56 and secured in place when the two flanges are fastened together. Again, it is preferred to make the continuity between the walls of the expansion chamber 12 and straight chamber 16 as free of perturbations to the flow of lasing material as possible.

The portion of flow channel formed by the chambers or regions 16, 18, 20, 30, 32, 34 may typically be fashioned to include a unitary conduit 62 which is centrally apertured on both sides thereof to receive concave plate members 64 and 66. The conduit member 62 is milled on opposite edge portions 68 and 70 (FIGS. 3A and 6) to receive lip portions 72 and 74 of the insert plate members 64 and 66. Shown in FIG. 6, the lip 72 or 74 may be secured to the milled portions 68 70 as by bolts 78 with O-ring seals 80 and 82 between the two portions 68 and 72 and with shims 84 or 86 providing a smooth transition between the inner surface of the chamber 16 and the insert plate members 64 or 66. Pins 88 or 90 are provided to secure the shims 84 and 86 respectively to the insert plate members 64 and 66. The shims 84 and 86 are made to provide a smooth transition between the two regions 16 and 18 without abrupt discontinuities or steps which would upset the flow characteristics and impair a thin laminar boundary layer.

The compression region 18 is provided by converging portions 92 and 94 of the insert plate members 64 and 66 which narrow the flow channel from a width of approximately 3 cm for a typical exemplary case to a separation of approximately 0.3 cm. At the point of maximum approach in the members 92 and 94, are terminations 96 and 98 fashioned to hold the windows 22 and 24 with a flush mount to prevent the generation of any disturbances in the flow of laser material. Excitation radiation sources 95 and 97 as known in the out illuminate the flow through the windows 22 and 24. In a typical case, the half angle between the portions 92 and 94 is approximately 10° while the half angle between the windows 22 and 24 is preferably made slight, but not zero, for example one-half degree.

Beyond the windows 22 and 24 and by reference to FIGS. 2B and 3B are further portions 100 and 102 of the inserts 64 and 66 which include terminations 104 and 106 into which the windows 22 and 24 are secured. The windows 22 and 24 may be secured into the ends 96, 98, 104 and 106 by an appropriate cement. The windows are typically 20 cm long. Discontinuities at the juncture of chambers 16, 18 and 20 are preferably kept no greater than 0.002 inches.

The portions 100 and 102 also include first sections 108 and 110 which define the chamber 30 of constant cross-sectional area but rough interior surface in order to trip the flow of laser material into a turbulent condition. The roughness is readily achieved by sandblasting and may be characterized by a roughness of "0.002". Beyond the sections 108 and 110 are sections 112 and 114 of the portions 100 and 102 which define the diverging or expansion chamber 32 of the flow channel. Beyond the sections 112 and 114, the inserts 64 and 66 are milled to provide a lip 116 in the insert 64 and a lip 118 in the insert 66. The lips 116 and 118 mate with further lips defined by the milled portions 68 and 70 and are secured in place as by bolts with the interior flow channel defining surfaces smoothly mated through shims 120 and 122 secured by pins 124 and 126 substantially as described above with respect to FIG. 6.

Straight chamber 34 of the flow channel is defined by the remainder of the unitary rectangular conduit 62 which terminates in a flange 128 that mates with a flange 130 on the end of a conduit 132 defining the chamber 36 that converts the flow cross-sectional shape. The conduit 132 is configured to change in cross-section from the rectangular area of narrow, thin dimension to a substantially circular cross-section where the conduit 132 terminates in a flange 134 for coupling, through a flange 136, to a pipe 138 of the exit conduit 38.

Along the sides of the unitary conduit 62, window assemblies 140 and 142 (FIG. 2A, 2B) are typically flush mounted to provide for the entry and exit of a laser beam. Alternatively, in the case where the flow channel is used for a laser oscillator rather than an amplifier, one of the assemblies may include in place of the window a reflecting mirror.

The window assemblies 140 and 142 are more fully illustrated in FIG. 5, a sectional view along the lines illustrated in FIG. 4. The assembly 140 is there shown to include a cover plate 144 which is secured into a milled recess in the unitary conduit 62. The plate 144 has a central aperture 146 aligned with an aperture 148 through the edge of the conduit 62. A window 150 having plane parallel sides and fabricated of an optical quality transmissive material such as quartz is secured between the plate 144 and milled portion of the conduit 62 in recessed shoulders which provide a means of securely holding the window 150. The alignment of the holes 146 and 148 is such as to make the region between the windows 22 and 24 in the inserts 64 and 66 directly visible through the window 150 and its corresponding counterpart on the insert 142.

The above-described structure is particularly adaptable for high power, high repetition rate lasing of a laseable fluid applied through the flow channel. For this purpose, the lasing material may be excited through the windows 22 and 24 by a flashlamp such as illustrated in U.S. patent application Ser. No. 614,223, filed Sept. 17, 1975 and commonly assigned herewith. For this purpose, the flow channel is typically installed within the upper portions of a spherical cavity, upper arms 162 and 164 thereof being illustrated in FIGS. 2A and 2B respectively. In such a case, the flashlamp is typically installed along axis 26 directly below the window assembly 140, and a reflective surface 166 is provided to direct a beam 168 of radiation orthogonal to the axis 26 for convenience in directing it through the flow channel.

It is to be understood that the specific structure illustrated above for the flow channel of the present invention is illustrative of a typical manner of implementing the invention for providing a low turbulence, thin laminar boundary layer flow of fluent laser material passed a region of transverse laser excitation application to provide a high power, high repetition rate laser with a high quality output beam. Modifications and improvements to the structure are intended to fall within the scope of the invention which is defined solely as indicated in the following claims.

What is claimed is:

1. A flow channel for an excitation radiation excited fluid medium laser and operative to receive fluid medium from an inlet conduit, to prepare the flow for high repetition rate, high power excitation to a lasing condition in which a low divergence, high quality laser beam is generated and to exhaust the fluid medium to an outlet conduit, said flow channel comprising:
    first and second optically transmissive windows positioned in approximately facing relationship and optically transmissive to the excitation radiation for said fluid medium;
    means responsive to the flowing medium from said inlet conduit for converging said flow to pass between said first and second windows;
    means associated with said converging means for preparing said flow to provide thin laminar flow boundary layers in said medium flowing past said first and second windows; and
    means for providing turbulent expansion including means directly downstream of said first and second windows for inducing turbulence in the laminar flow of fluid laser material flowing past said first and second windows.

2. The flow channel of claim 1 wherein said means for preparing said flow to provide a thin laminar flow boundary layer includes:
    means for compressing the fluid laser material in the direction of said first and second windows; and
    means for providing a smooth transition on interior surfaces of said channel between said inlet conduit and said first and second windows substantially without discontinuities in the channel boundaries for said fluid medium.

3. The flow channel of claim 2 wherein said means for compressing includes channel walls each converging toward the planes of said first and second windows at angles of approximately 10°.

4. The flow channel of claim 1 wherein said converging means includes a progressively narrowing conduit which provides a contraction ratio of at least approximately 10-to-1.

5. The flow channel of claim 1 wherein the transition from said converging means to said first and second windows contains discontinuities no greater than approximately 0.002 inches.

6. The flow channel of claim 1 wherein said first and second windows converge toward each other with a half angle of approximately one-half degree.

7. The flow channel of claim 1 wherein said converging means includes:
an expansion conduit increasing the cross-sectional area of the flow from said inlet conduit to a substantially rectangular cross-section;
a fine screen of at least approximately 40 mesh downstream of said expansion region;
a plenum extending beyond said screen with substantially constant cross-sectional area along the direction of flow of said fluid laser medium;
means for compressing the flow of fluid laser material with progressively smaller rectangular cross-section by reducing the small dimension of said rectangular cross-section toward said first and second windows; and
means for providing a smooth, low discontinuity transition in channel edge walls between said plenum and said first and second windows.

8. The flow channel of claim 1 wherein said means for providing turbulent expansion includes channel boundary walls having uneven surfaces thereto facing the flow of fluid laser material.

9. The flow channel of claim 8 wherein said means for providing turbulent expansion further includes a region of expanding cross-sectional area beyond the region of uneven surface channel walls.

10. The flow channel of claim 9 further including means for adjusting the cross-sectional shape of the flow of fluid laser material to match the cross-sectional shape of said outlet conduit generally without significant alteration in cross-sectional area to the flow of fluid medium.

11. The flow channel of claim 1 further including:
means for providing excitation radiation through said first and second windows to the flowing laser material through first and second regions of said windows;
said first and second windows extending in opposite directions along the direction of flow of said fluid laser material substantially beyond said first and second regions.

12. A flow channel for an excitation radiation excited fluid medium laser and operative to receive fluid medium from an inlet conduit to prepare the flow for high repetition rate, high power excitation to a lasing condition in which a low divergence, high quality laser beam is generated and to exhaust the fluid medium to an outlet conduit, said flow channel comprising:
first and second optically transmissive windows positioned in approximately facing relationship and optically transmissive to the excitation radiation for said fluid medium;
means including a walled conduit responsive to the flowing medium from said inlet channel for converging said flow in a rectangular cross-section to pass between said first and second windows;
an expansion conduit increasing the cross-sectional area of the flow from said inlet conduit to a substantially rectangular cross-section;
a fine screen of at least approximately 40 mesh downstream of said expansion region;
a plenum extending beyond said screen with substantially constant cross-sectional area along the direction of flow of said fluid laser medium;
said converging means compressing the flow of fluid laser material with progressively smaller rectangular cross-section by reducing the small dimension of said rectangular cross-section between conduit walls by a factor of at least 10 with the conduit walls angled at approximately 10° with respect to said first and second windows;
means for providing a smooth, low discontinuity transition in channel edge walls between said plenum and said first and second windows wherein the discontinuities are no greater than approximately 0.002 in.;
said first and second windows converging slightly toward each other in the direction of fluid material flow; and
means for providing turbulent expansion including means directly downstream of said first and second windows for inducing turbulence in the laminar flow of fluid laser material flowing past said first and second windows.

* * * * *